(12) United States Patent
Fujishima

(10) Patent No.: US 11,865,901 B2
(45) Date of Patent: Jan. 9, 2024

(54) GLASS RUN

(71) Applicant: KINUGAWA RUBBER IND. CO., LTD., Chiba (JP)

(72) Inventor: Yukiko Fujishima, Chiba (JP)

(73) Assignee: KINUGAWA RUBBER IND. CO., LTD., Chiba (JP)

( * ) Notice: Subject to any disclaimer, the term of this patent is extended or adjusted under 35 U.S.C. 154(b) by 0 days.

(21) Appl. No.: 17/851,531

(22) Filed: Jun. 28, 2022

(65) Prior Publication Data

US 2022/0410683 A1    Dec. 29, 2022

(30) Foreign Application Priority Data

Jun. 29, 2021    (JP) ................. 2021-107186

(51) Int. Cl.
*B60J 10/21*    (2016.01)
*B60J 10/76*    (2016.01)
*B60J 5/04*    (2006.01)

(52) U.S. Cl.
CPC ............ *B60J 10/76* (2016.02); *B60J 5/0402* (2013.01); *B60J 10/21* (2016.02)

(58) Field of Classification Search
CPC ... B60J 10/75; B60J 10/21; B60J 10/18; B60J 10/00; B60J 10/265; B60J 10/30; B60J 10/23; B60R 13/04; B60R 13/02
See application file for complete search history.

(56) References Cited

U.S. PATENT DOCUMENTS

| | | | | |
|---|---|---|---|---|
| 5,740,640 | A * | 4/1998 | Yasuda | B60J 10/265 52/204.597 |
| 7,934,341 | B2 * | 5/2011 | Knight | B60J 10/265 49/377 |
| 8,429,855 | B2 * | 4/2013 | Stefanelli | B60J 10/75 49/440 |
| 9,956,858 | B2 * | 5/2018 | Sobue | F16J 15/025 |
| 11,110,783 | B2 * | 9/2021 | Sävström | B60J 10/75 |
| 2016/0214471 | A1 | 7/2016 | Bessho et al. | |
| 2018/0244215 | A1 * | 8/2018 | Husek | B60J 1/10 |

FOREIGN PATENT DOCUMENTS

| | | |
|---|---|---|
| JP | 2010-083160 A | 4/2010 |
| JP | 6304716 B2 | 4/2018 |

\* cited by examiner

*Primary Examiner* — Janet M Wilkens
*Assistant Examiner* — Susan M. Heschel
(74) *Attorney, Agent, or Firm* — Foley & Lardner LLP

(57) ABSTRACT

A corner die-molding portion of a glass run includes an outer peripheral portion to cover an end flange portion of an outer panel of a door, a holding portion having one end portion connected to an inner surface of the outer peripheral portion, and a supporting portion provided between the holding portion and the inner surface of the outer peripheral portion. An inner space and its opening are provided between the outer peripheral portion and the holding portion such that, when the glass run is attached to a window frame, the end flange portion of the outer panel is inserted into the inner space from the opening, and then the supporting portion is brought into abutment against a tip end of the end flange portion of the outer panel. It is possible to suppress flexural deformation of the outer peripheral portion, thereby improving the glass run in external appearance.

18 Claims, 9 Drawing Sheets

GLASS RUN

BACKGROUND OF THE INVENTION

The present invention relates to a glass run that is adapted to be attached to a window frame of a vehicle door and that is prepared by integrally connecting a plurality of straight portions formed by an extrusion molding to die molding portions as corner portions that are formed by a die molding, and particularly to a glass run in which the die molding portion arranged at a corner portion of a waist side (waist line) seal is supported on a flange portion of an outer panel of the door.

Japanese Patent Application Publication No. 2010-083160 discloses a glass run in which a glass run corner portion has a vehicle-exterior-side rib between a vehicle-exterior-side side wall and a vehicle-exterior-side cover lip. This rib is fit into a vehicle-exterior-side recess formed in a door-frame corner portion.

With reference to FIGS. 7-9, a related-art glass run is described as follows. FIG. 7 is a side view of an automotive front door to which a glass run according to the related art can be applied. FIG. 8 is a view similar to FIG. 1, but showing an enlarged view of a portion of FIG. 7 showing a condition in which a glass run according to the related art is attached to a window frame of an automotive front door. FIG. 9A is a sectional view taken along lines 9A-9A of FIG. 8, showing a condition before pressing down an outer peripheral portion of a die molding portion of the glass run by fingers (including thumb). FIG. 9B is a view similar to FIG. 9A, but showing a condition after pressing down the outer peripheral portion with a flexural deformation.

As is well known, an automotive front door 1 (see FIG. 7) is one integrated by connecting an outer panel 8 and an inner panel 9 by hemming, etc. As shown in FIG. 7, the automotive front door 1 is constituted of a door body 2 below a door waist opening and an arch-shaped door sash section 3 above the door waist opening. A window frame 4 is formed by the door body 2 and the door sash section 3.

This window frame 4 is provided on its inner periphery with a glass run 6 made of a material of rubber, etc. for providing a sealing between the window frame 4 and the door glass 5.

As shown in FIG. 7, this glass run 6 is constituted of an upper side section 6a, a lower side section 6b, a vertical side section 6c, etc. Each of these sections 6a-6c, etc. is formed by extrusion molding. Each corner portion connected to an end portion of each straight portion is formed of a die molding portion 7 made by die molding. The straight portions are integrally joined together by the die molding portions 7. With this, the glass run 6 as a whole is formed along an inner periphery of the window frame 4.

As shown in FIG. 9A, the die molding portion 7 for connecting the lower side section 6b as a waist side (waist line) seal with the vertical side section 6c is adapted to be fixedly fit between an end flange portion 8a at an end of an outer panel 8 of the window frame 4 and an end flange portion 9a at an end of an inner panel 9, which is opposed to the end flange portion 8a.

As shown in FIGS. 8 and 9A, the die molding portion 7 for connecting the lower side section 6b and the vertical side section 6c is formed in a generally L-shape in plan view. The die molding portion 7 has an outer peripheral portion 7a that is generally arch-shaped in a transverse or vertical cross-section, and a holding portion 7b that extends from an inner surface of an inner end portion of the outer peripheral portion 7a toward the window frame 4 and then is in abutment and held on the end flange portion 9a of the inner panel 9. The lower side section 6b is provided with a plurality of lips not shown in the drawings, which are slidable on an outer surface of the door glass 5. The die molding portion 7 is monolithically provided with three ribs 10 inclined as shown in FIG. 8, between the outer peripheral portion 7a and the holding portion 7b (see FIG. 9A). Each rib 10 is formed into a thin thickness by the same material as that of the glass run 6 and has a function to hold the shape of the outer peripheral portion 7a of the die molding portion 7.

When the glass run 6 is attached to the inner peripheral section of the window frame 4, the glass run 6 is arranged along the inner peripheral section of the window frame 4 and is fixedly attached to the inner panel 9 by using a plurality of clips, etc.

In particular, on the side of the die molding portion, as shown in FIG. 9A, an outer surface of the outer peripheral portion 7a is pressed downward as shown by the arrow by fingers (including thumb). Using this pressing force, a tip end 8b of the end flange portion 8a of the outer panel 8 is inserted from an opening, which is defined between the outer peripheral portion 7a and the holding portion 7b, into between the holding portion 7b and a lower portion of each rib 10. An outer surface of the holding portion 7b is brought into abutment with an inner surface of the end flange portion 9a of the inner panel 9, and then the holding portion 7b and the end flange portion 9a are connected together by clips, etc. With this, the die molding portion 7 is attached to the window frame 4.

SUMMARY OF THE INVENTION

When attaching the die molding portion 7 of the related-art glass run 6 to the door panel, however, if the outer peripheral portion 7a of the die molding portion 7 is pressed down as shown by the arrow of FIG. 9A by fingers (including thumb), the outer peripheral portion 7a as a whole including each rib 10 may be subjected to a so-called crushing or flexural deformation to generate a downward displacement by a predetermined distance S relative to the window frame 4, as shown in FIG. 9B. In other words, each rib 10 is low in rigidity due to its thin thickness and cannot resist against the pressing force by the fingers. Therefore, the outer peripheral portion 7a may be crushed and deformed. With this, the die molding portion 7 may be displaced in a downward direction to cause lowering the external appearance.

The present invention has been made in view of such problems of the related art. It is therefore an object of the present invention to provide a glass run that is improved in external appearance by suppressing flexural deformation of the outer peripheral portion.

According to the present invention, there is provided a first glass run that is adapted to be attached to an inner peripheral section of a window frame formed by inner and outer panels of a door, the first glass run including:
- a first straight portion formed by an extrusion molding; and
- a die molding portion forming a corner portion of the glass run, the corner portion being connected to an end portion of the first straight portion, the die molding portion being formed by a die molding, the die molding portion including:
- an outer peripheral portion that is adapted to cover an end flange portion of the outer panel of the door;

a holding portion that has one end portion connected to a first position of an inner surface of the outer peripheral portion, and another end portion adapted to extend toward the inner panel of the door; and a supporting portion provided between the holding portion and a second position of the inner surface of the outer peripheral portion, the second position being defined as a position to which the one end portion of the holding portion is not directly connected, wherein the die molding portion has an inner space and an opening of the inner space that are defined between the outer peripheral portion and the holding portion such that, when the glass run is attached to the window frame, the end flange portion of the outer panel of the door is inserted into the inner space from the opening, and then the supporting portion is brought into abutment against a tip end of the end flange portion of the outer panel of the door.

According the first glass run, when the outer surface of the outer peripheral portion is pressed down by a force through fingers (including thumb) to attach the die molding portion of the glass run to the window frame, the end flange portion of the outer panel is inserted into the inner space from the opening, and then the tip end of the end flange portion is brought into abutment with the underside of the supporting portion. With this, the outer peripheral portion is supported on the end flange portion of the outer panel via the supporting portion against the pressing-down force. That is, the supporting portion serves as a stopper in relation to the end flange portion, thereby suppressing an excessive flexural deformation of the outer peripheral portion. With this, it is possible to suppress the positional displacement of the glass run (the die molding portion as a whole) in a vertical direction, thereby precisely positioning the glass run and preventing lowering of the external appearance of the glass run. Even in a case that the tip end of the end flange portion of the outer panel is slightly short in length or slightly low in position or that the size of the opening between the outer peripheral portion and the holding portion is greater than the standard due to the production error, etc., if an abutment between the supporting portion and the tip end of the end flange portion is secured, it is possible to sufficiently suppress the excessive flexural deformation of the outer peripheral portion. Therefore, the positional displacement of the die molding portion as a whole, etc. can be prevented. Since the supporting portion is provided to connect the outer peripheral portion and the holding portion, when a force is applied to press down the outer surface of the outer peripheral portion, it is possible to prevent the opening from accidentally opening up since the supporting portion stretches between the outer peripheral portion and the holding portion. With this, the tip end of the end flange portion does not come off the abutment surface of the supporting portion, thereby making a stable support possible.

The first glass run may be a second glass run, wherein the supporting portion is provided in the inner space of the die molding portion and is continuously formed to cover a range in which a force to press down an outer surface of the outer peripheral portion of the die molding portion is applied, when the glass run is attached to the window frame.

According to the second glass run, the supporting portion is provided in the inner space of the die molding portion and may be continuously formed in a longitudinal direction of the die molding portion to cover a range in which a force to press down an outer surface of the outer peripheral portion of the die molding portion is applied. Therefore, it becomes possible to sufficiently resist the force via the end flange portion of the outer panel. With this, it is possible to further suppress the flexural deformation of the outer peripheral portion and to prevent the positional displacement of the die molding portion as a whole, etc.

The second glass run may be a third glass run, wherein the supporting portion is formed into a plate shape extending between an end portion of the holding portion and the second position of the inner surface of the outer peripheral portion, wherein the supporting portion has a first portion that extends in a direction of the outer peripheral portion from the end portion of the holding portion to a midpoint between the holding portion and the outer peripheral portion, and a second portion that extends from the midpoint to the second position of the inner surface of the outer peripheral portion, wherein the first portion is greater than the second portion in thickness.

According to the third glass run, the first portion is greater than the second portion in thickness. With this, it is possible to increase the supporting force when abutted against the tip end of the end flange portion, thereby stably and securely suppressing the flexural deformation of the outer peripheral portion by the pressing-down force. According to the third glass run, the second portion is less than the first portion in thickness. With this, it becomes possible to suppress the occurrence of sink on the outer surface of the outer peripheral portion when conducting the die molding by a rubber material or a resin material.

The third glass run may be a fourth glass run, wherein the first portion of the supporting portion is adapted to be substantially horizontal such that the first portion is brought into a vertical abutment against the tip end of the end flange portion of the outer panel, when the glass run is attached to the window frame by pressing down the outer surface of the outer peripheral portion, wherein, when the first portion of the supporting portion is substantially horizontal, the second portion of the supporting portion is inclined relative to the first portion and extends from the midpoint toward a bent portion of the outer peripheral portion, a position of the bent portion corresponding to the second position of the inner surface of the outer peripheral portion.

According to the fourth glass run, the first portion of the supporting portion is adapted to be substantially horizontal. With this, the first portion is brought into a vertical abutment against the tip end of the end flange portion of the outer panel by applying the pressing-down force. Therefore, it is possible to obtain a stable supporting force to support the outer peripheral portion. Furthermore, the second portion of the supporting portion is inclined relative to the first portion. With this, the second portion may be perpendicular to the bent portion, thereby effectively suppressing sink on the bent portion where sink tends to occur during the die molding.

The third glass run may be a fifth glass run, wherein a rib that connects the end portion of the holding portion with the inner surface of the outer peripheral portion is provided between the holding portion and the outer peripheral portion at a position that is closer to a vehicle interior than the supporting portion.

According to the fifth glass run, the rib can assist the supporting portion. Therefore, it becomes possible to further resist the force to press down the outer peripheral portion, thereby suppressing the flexural deformation of the outer peripheral portion.

The second glass run may be a sixth glass run, wherein the supporting portion is provided between an end portion of the holding portion and the inner surface of the outer peripheral portion and is adapted to be substantially horizontally arranged such that the supporting portion is brought into a vertical abutment against the tip end of the end flange portion of the outer panel, when the glass run is attached to the window frame by pressing down the outer surface of the outer peripheral portion, the supporting portion as a whole having a substantially uniform thickness.

The second glass run may be a seventh glass run, wherein the supporting portion is provided between an end portion of the holding portion and the inner surface of the outer peripheral portion and is adapted to be substantially horizontally arranged such that the supporting portion is brought into a vertical abutment against the tip end of the end flange portion of the outer panel, when the glass run is attached to the window frame by pressing down the outer surface of the outer peripheral portion, the supporting portion having a first portion that is connected to the end portion of the holding portion and a second portion that is connected to the inner surface of the outer peripheral portion, the second portion being less than the first portion in thickness.

The second glass run may be an eighth glass run, wherein a corner is formed between the holding portion and the supporting portion such that the tip end of the end flange portion of the outer panel is fit to the corner.

The eighth glass run may a ninth glass run, wherein the corner is adapted to extend along the tip end of the end flange portion of the outer panel such that top and inner surfaces of the tip end of the end flange portion of the outer panel are respectively brought into abutment and surface contact against a lower surface of the supporting portion and an outer surface of the holding portion.

According to the eighth or ninth glass run, it is possible to sufficiently suppress the flexural deformation of the outer peripheral portion since the glass run is securely supported on the outer panel at the corner.

The eighth glass run may be a tenth glass run, wherein the supporting portion is substantially perpendicular to the holding portion and vice versa at the corner.

The eighth glass run may be an eleventh glass run, wherein the holding portion and the supporting portion are adapted to be respectively substantially vertically and horizontally arranged at the corner, and the end flange portion of the outer panel is substantially vertically arranged, such that the tip end of the end flange portion of the outer panel is fit to the corner.

The fifth glass run may be an twelfth glass run, wherein the rib is substantially parallel with the second portion of the supporting portion.

The fourth glass run may be a thirteenth glass run, wherein the second portion of the supporting portion is substantially perpendicular to the bent portion of the outer peripheral portion.

The first glass run may be a fourteenth glass run, wherein the outer peripheral portion is formed at a lower end thereof with a lip portion that is adapted to be brought into an elastic abutment against an outer surface of the outer panel.

The fourth glass run may be a fifteenth glass run, wherein the outer peripheral portion in a vertical cross-section of the glass run has an inclined upper half portion that extends from the bent portion to an upper end portion of the outer peripheral portion, and a lower half portion that extends substantially vertically from the bent portion to a lip portion formed at a lower end portion of the outer peripheral portion.

The first glass run may be a sixteenth glass run, wherein the holding portion has an upper end portion that is connected to the first position of the inner surface of the outer peripheral portion, and the upper end portion of the holding portion is substantially perpendicular to the supporting portion.

The third glass run may be a seventeenth glass run, wherein the holding portion has an upper end portion that is connected to the first position of the inner surface of the outer peripheral portion, and the upper end portion of the holding portion is substantially perpendicular to the first portion of the supporting portion.

The second glass run may be an eighteenth glass run, wherein the supporting portion is continuously formed in a longitudinal direction of the die molding portion.

The first glass run may be a nineteenth glass run, wherein the glass run further comprises a second straight portion, and the die molding portion is positioned between the first straight portion as a lower side section of the glass run and the second straight portion as a vertical side section of the glass run, the die molding portion connecting the first and second straight portions together.

The eighteenth glass run may be a twentieth glass run, wherein the first straight portion is formed on an inner side thereof with upper and lower lips that are adapted to be slidably in contact with an outer surface of a door glass of the door, thereby providing sealing between the window frame and the door glass.

DETAILED DESCRIPTION

First Embodiment

Figure 1:
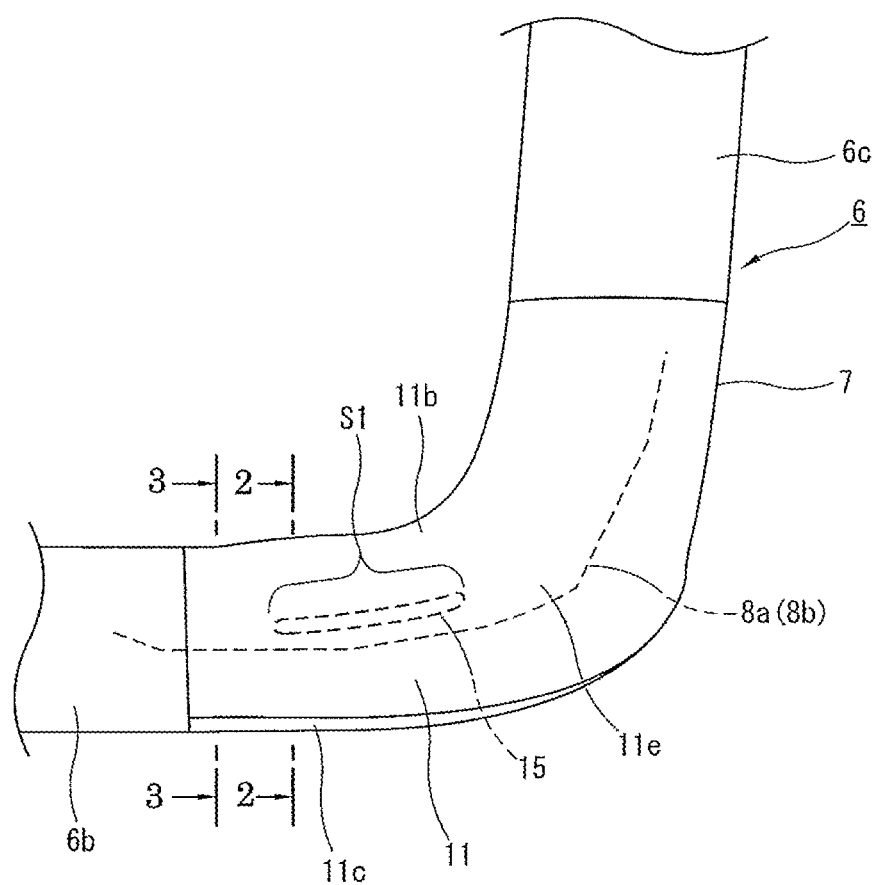
FIG. 1 is an enlarged view of a portion of FIG. 7 showing a condition in which a glass run according to the present invention is attached to a window frame of an automotive front door.
Figure 2:
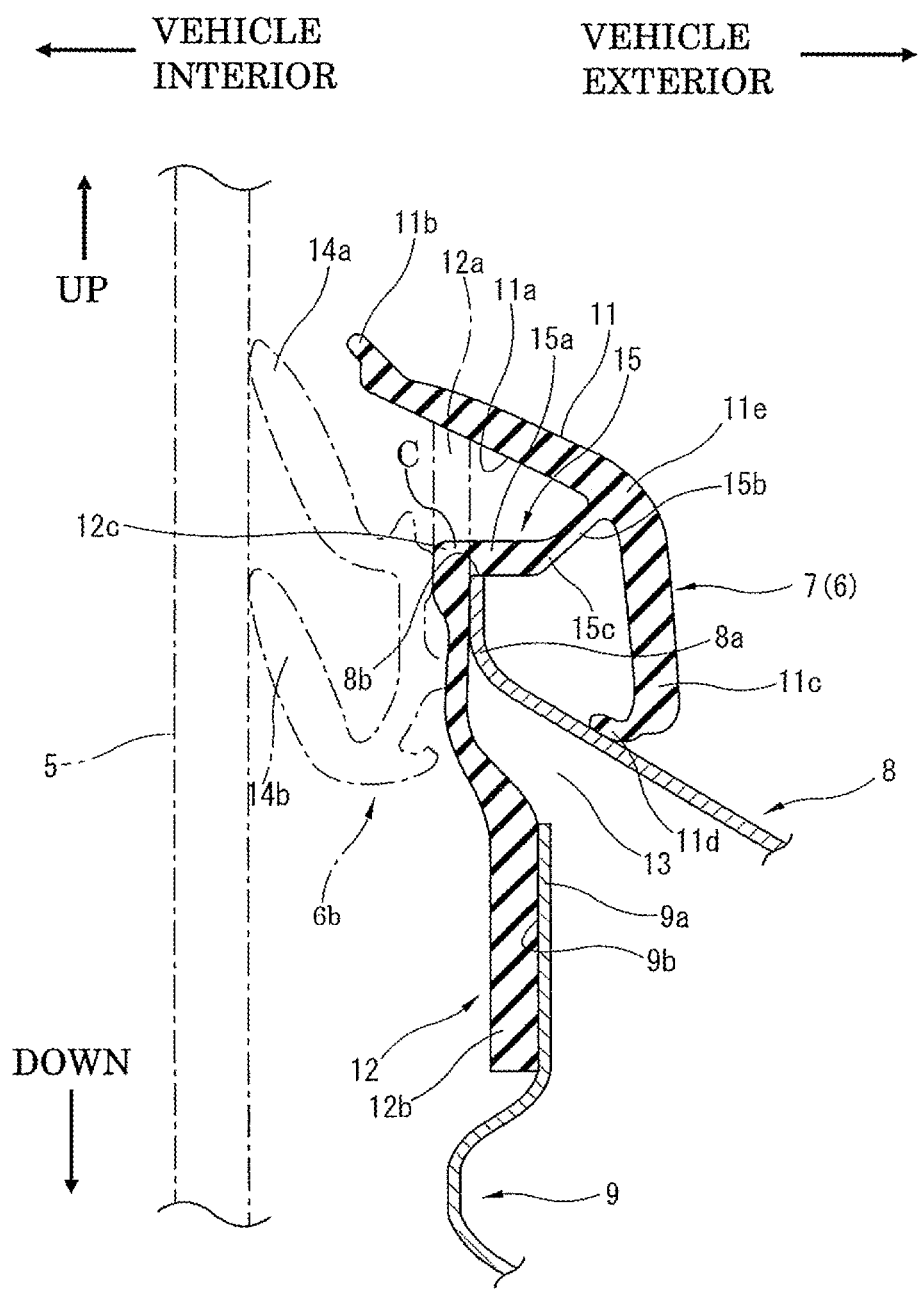
FIG. 2 is an enlarged sectional view taken along lines 2-2 of FIG. 1, showing a glass run according to a first embodiment of the present invention.
Figure 3:
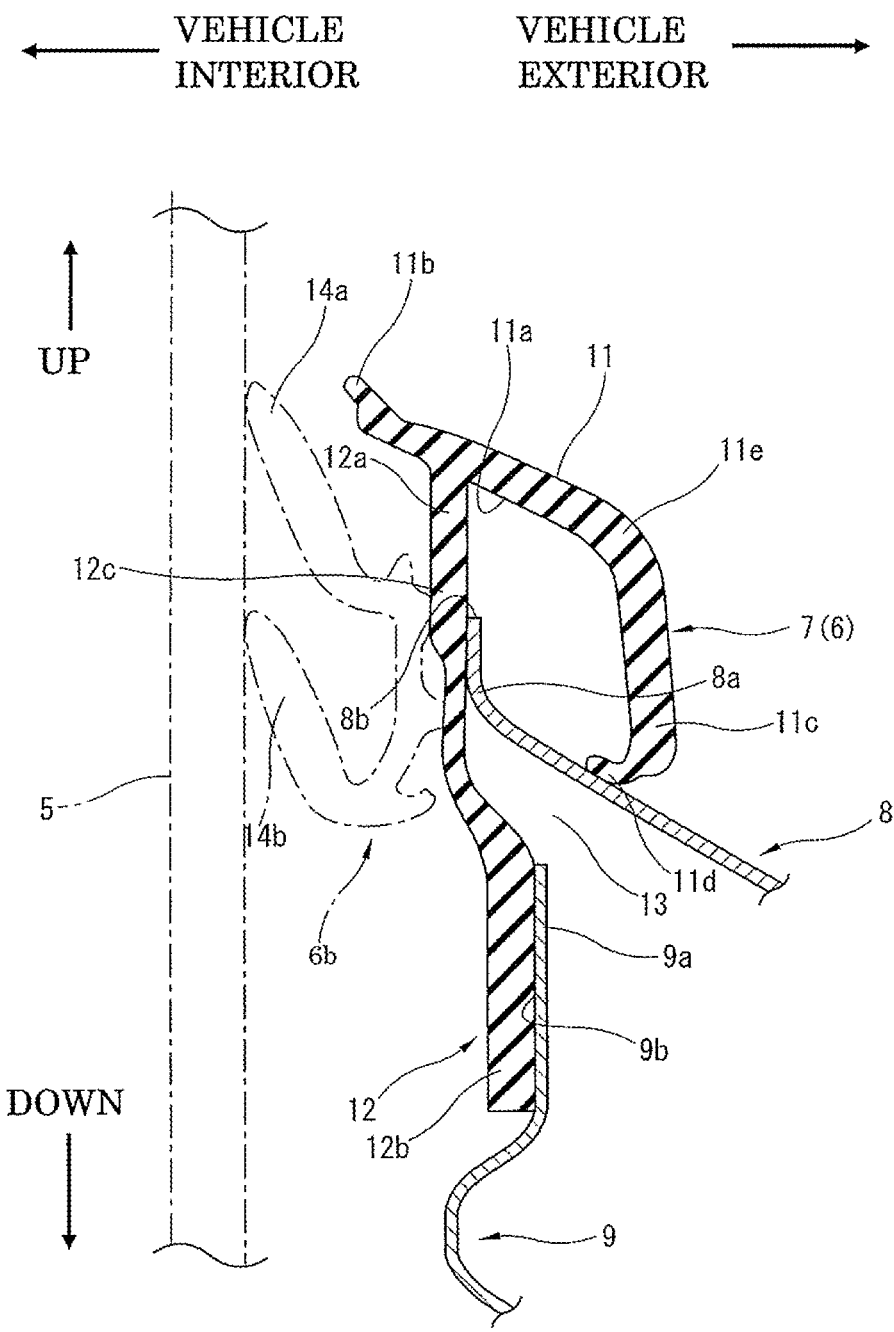
FIG. 3 is a view similar to FIG. 2, but showing an enlarged sectional view taken along lines 3-3 of FIG. 1.
Figure 7:
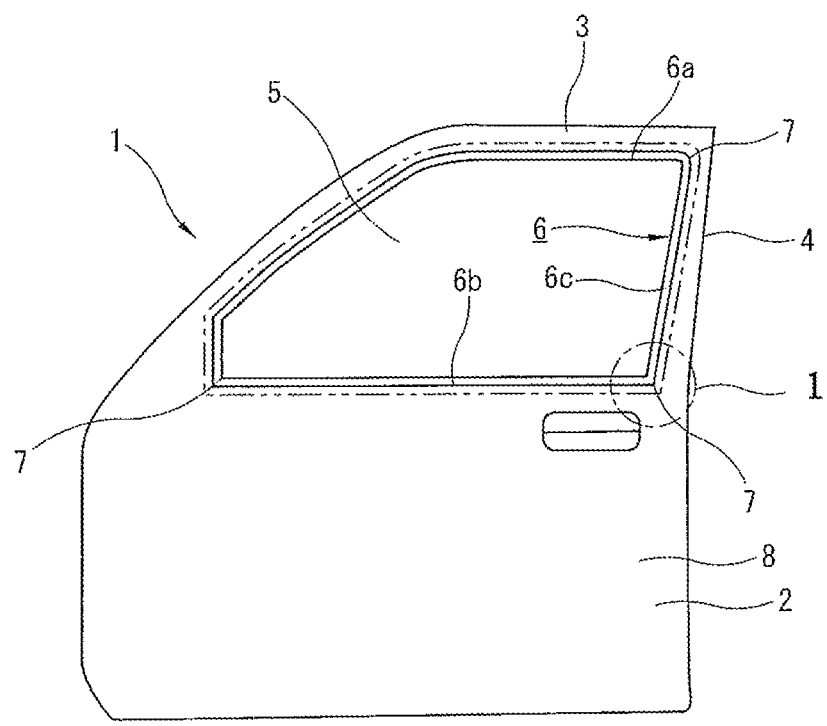
FIG. 7 is a side view of an automotive front door to which a glass run according to the related art or the present invention can be applied.
Figure 8:
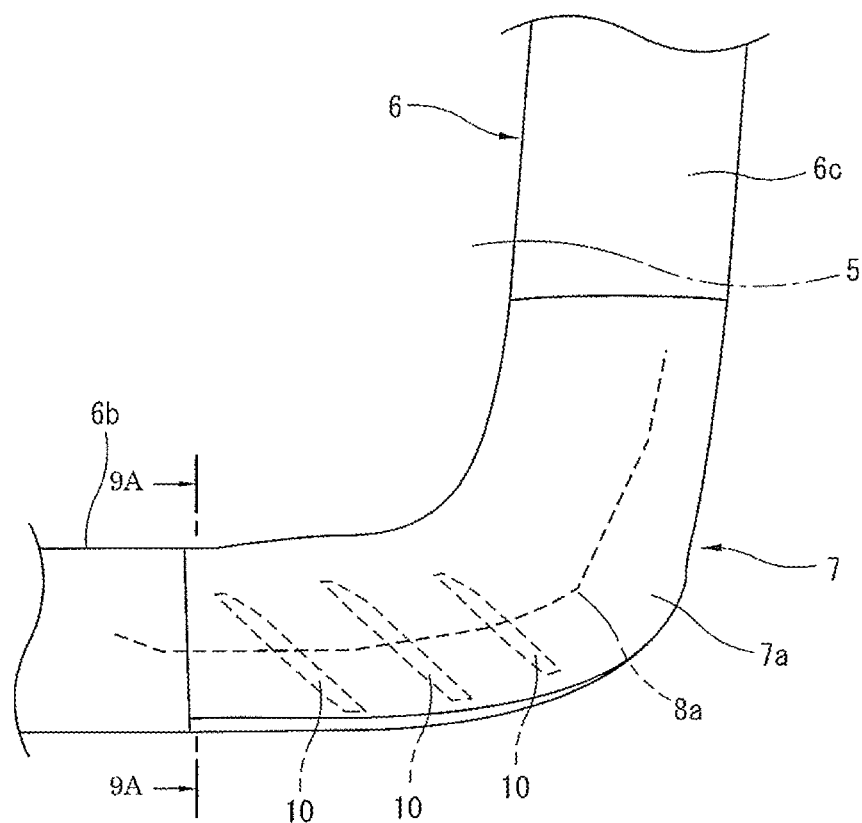
FIG. 8 is a view similar to FIG. 1, but showing a glass run according to the related art.

With reference to FIGS. 1-3 and 7, a glass run according to the first embodiment of the present invention is exemplarily described in the following. FIG. 1 is an enlarged view of a portion of FIG. 7 showing a condition in which a glass run according to the present invention is attached to a window frame of an automotive front door. FIG. 2 is an enlarged sectional view taken along lines 2-2 of FIG. 1, showing a glass run according to the first embodiment of the present invention. FIG. 3 is a view similar to FIG. 2, but showing an enlarged sectional view taken along lines 3-3 of FIG. 1

Similar to the related-art glass run, as shown in FIG. 7, a closed loop-shape glass run 6 for slidably guiding a door glass 5 is attached to an inner peripheral section of a window frame 4 formed of a door body 2 and a door sash section 3.

This glass run 6 is integrally formed by a rubber material or synthetic resin material as an elastic member. In the present embodiment, the glass run 6 is integrally formed by polyp-phenylene vinylene) (PPV). Furthermore, similar to conventional glass runs, the glass run 6 is constituted of an upper side section 6a, a lower side section 6b, a vertical side section 6c, etc. Each of these sections 6a-6c, etc. is formed by extrusion molding. Each corner portion connected to an end portion of each straight portion is formed of a die molding portion 7 made by die molding. The straight portions are integrally joined together by the die molding portions 7. With this, the glass run as a whole is formed along an inner periphery of the window frame 4.

As shown in FIG. 2, the glass run 6 is adapted to be fixedly fit between an end flange portion 8a at an end portion of an outer panel 8 of the window frame 4 and an end flange portion 9a at an end portion of an inner panel 9, which is opposed to the end flange portion 8a.

As shown by a dashed line of FIG. 2, the lower side section 6b as a waist side (waist line) seal is formed on its one side on the interior side with upper and lower lips 14a, 14b that are slidably in contact with an outer surface of a door glass 5.

As shown in FIGS. 1 and 2, the die molding portion 7 that connects the lower side section 6b and the vertical section 6c is formed in a generally L-shape in plan view. The die molding portion 7 has an outer peripheral portion 11 on the vehicle exterior side that is bent in a generally curved shape in a transverse or vertical cross-section, a holding portion 12 on the vehicle interior side that extends from an inner surface 11a of an inner end portion of the outer peripheral portion 11 towards the window frame 4 and then is in abutment and held on the end flange portion 9a of the inner panel 9, and an opening 13 that is formed between the outer peripheral portion 11 and the holding portion 12 and allows an upward insertion of the end flange portion 8a of the outer panel 8 from below into an inner space that is defined therebetween from the opening 13.

As shown in FIGS. 2 and 3, the outer peripheral portion 11 is elongated in cross-section to have a thickness that increases gradually from an upper end portion 11b to a lower end portion 11c and is arranged to cover the side of the end flange portion 8a of the outer panel 8 and the end flange portion 9a of the inner panel 9 with a bent portion lie that is positioned generally at a center of the outer peripheral portion 11 in a vertical direction and with the lower end portion 11c. The lower end portion 11c of the outer peripheral portion 11 is monolithically formed at its lower end with a lip portion 11d that is brought into elastic contact with an upper surface of the end flange portion 8a, when the end flange portion 8a of the outer panel 8 is inserted into the inner space between the outer peripheral portion 11 and the holding portion 12 through the opening 13. This lip portion 11d is bent to be inclined toward the holding portion 12 in order to maintain a predetermined elastic contact force against the upper surface of the end flange portion 8a.

As shown in FIG. 3, the holding portion 12 as a whole is formed into a generally linear shape in the vertical direction, but is formed at a generally central position in the vertical direction to be bent into a moderate crank shape. As shown in FIGS. 1 and 3, in positions except a predetermined region S1 near a bent area of the L-shape in plan view of the die molding portion 7, the holding portion 12 is monolithically connected at its upper end portion 12a in FIG. 3 as one end portion to the inner surface 11a of the upper end portion 11b of the outer peripheral portion 11. On the other hand, the lower end portion 12b in FIG. 3 as another end portion is in abutment and held on an inner surface 9b of the end flange portion 9a of the inner panel 9 in a condition that the glass run 6 is attached to the window frame 4.

In the predetermined region S1 (see FIG. 1) where the upper end portion 12a of the holding portion 12 directly connected to the inner surface 11a of the outer peripheral portion 11 is not provided, a supporting portion 15 against which a tip end 8b of the end flange portion 8a is brought into abutment from below is connected between an end portion 12c on the side of the upper end 12a of the holding portion 12 and the inner surface 11a of the bent portion lie of the outer peripheral portion 11. As shown in FIG. 2, at the end portion 12c, a corner C is provided between the supporting portion 15 and the holding portion 12, which are respectively substantially horizontally and vertically arranged. The end flange portion 8a is substantially vertically arranged, such that the tip end 8b is fit to the corner C when the glass run 6 is attached to the window frame 4. With this, the glass run 6 is securely supported on the outer panel 8, thereby suppressing the flexural deformation of the outer peripheral portion 11. The upper end 12a of the holding portion 12 is also adapted to be substantially vertically arranged.

As shown by a broken line of FIG. 1, the supporting portion 15 is continuously provided along the longitudinal direction of the outer peripheral portion 11, in the predetermined region S1 where the upper end portion 12a of the holding portion 12 directly connecting to the outer peripheral portion 11 is provided, that is, in a range where the pressing-down force in the downward direction by fingers (including thumb) against the outer surface of the upper end portion 11b of the outer peripheral portion 11 is applied when the glass run 6 is attached to the window frame 4, in the interior of the die molding portion 7.

As shown in FIG. 2, the supporting portion 15 is formed into a plate shape extending between an end portion 12c of the holding portion 12 and the inner surface 11a of the outer peripheral portion 11. The supporting portion 15 has a first portion 15a that extends in a direction of the outer peripheral portion 11 from one end connected to the end portion 12c of the holding portion 12, to a midpoint 15c, and a second portion 15b that extends from the midpoint 15c to another end connected to the inner surface 11a of the outer peripheral portion 11. The first portion 15a is generally horizontally arranged so as be brought into a vertical abutment against the tip end 8b of the end flange portion 8a. In contrast, the second portion 15b is inclined relative to the first portion 15a and extends from the midpoint 15c toward the bent portion 11e of the outer peripheral portion 11. The first portion 15a is set to be greater than the second portion 15b in thickness. The upper end portion 12a of the holding portion 12 is substantially perpendicular to the first portion 15a (see FIG. 2).

Advantageous Effects of Glass Run According to First Embodiment

Figures 9A, 9B:
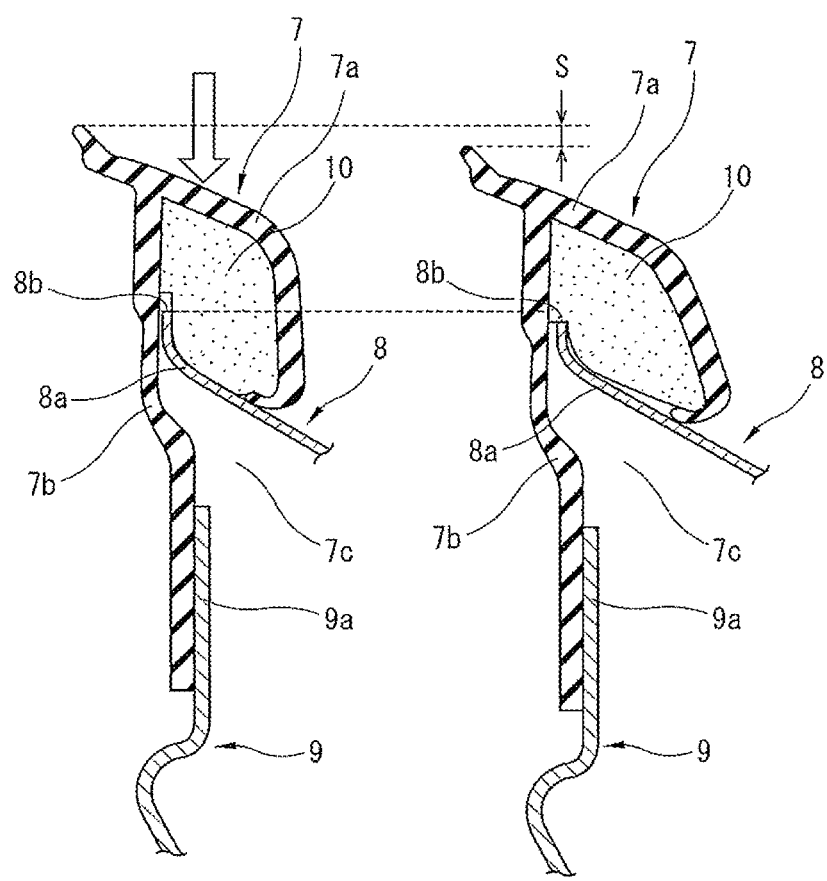
FIG. 9A is a sectional view taken along lines 9A-9A of FIG. 8, showing a condition before pressing down an outer peripheral portion of a die molding portion of the glass run by fingers (including thumb)
FIG. 9B is a view similar to FIG. 9A, but showing a condition after pressing down the outer peripheral portion with a flexural deformation.

Firstly, when the die molding portion 7 for connecting the vertical side section 6c and the lower side section 6b as a waist side (waist line) seal is attached to the window frame 4 (see FIG. 7), similar to the case shown in FIG. 9(a), the outer surface of the upper end portion 11b of the outer peripheral portion 11 is pressed down by fingers (including thumb) in a downward direction shown by the arrow of FIG. 9(a). This pressing-down force makes the end flange portion 8a of the outer panel 8 inserted from the opening 13 into the inner space defined between the holding portion 12 and the outer peripheral portion 11. Then, while the tip end portion of the end flange portion 8a is kept in abutment with the outer surface of the holding portion 12, the tip end 8b is brought into abutment from below against the lower surface of the first portion 15a in the vicinity of the position connected to the end portion 12c of the holding portion 12.

As a result, the outer peripheral portion 11 is supported on the end flange portion 8a via the supporting portion 15 to be resistant against the pressing-down force. That is, the supporting portion 15 serves as a stopper in relation with the end flange portion 8a, thereby preventing an excessive flexural deformation of the outer peripheral portion 11. With this, the occurrence of a downward displacement of the die molding portion 7 as a whole like the related-art one (see FIG. 9B) can be suppressed, thereby achieving a secure positioning of the glass run and preventing lowering of external appearance thereof.

Even in case that the tip end 8b of the end flange portion 8a of the outer panel 8 is slightly short in length or slightly low in position, or even in case that the size of the opening 13 between the outer peripheral portion 11 and the holding portion 12 is greater than the standard due to the production error, etc., if an abutment between the supporting portion 15 and the tip end 8b of the end flange portion 8a is secured, it is possible to sufficiently suppress an excessive flexural deformation of the outer peripheral portion 11. Therefore, the positional displacement of the die molding portion 7 as a whole, etc. can be prevented.

Furthermore, the supporting portion 15 is provided in the form of connecting the outer peripheral portion 11 and the holding portion 12. Therefore, in case that a force is applied to press down the outer surface of the outer peripheral portion 11, it is possible to prevent the opening 13 from accidentally opening up since the supporting portion 15 stretches between the outer peripheral portion 11 and the holding portion 12. With this, the tip end 8b of the end flange portion 8a does not come off the abutment surface of the supporting portion 15 that is in abutment with the tip end 8b, thereby making a stable support possible.

Furthermore, the supporting portion 15 is provided in the inner space of the die molding portion 7 and is continuously formed in a longitudinal direction of the die molding portion 7 (see FIG. 1) to cover the predetermined range S1 in which a force to press down the outer surface of the outer peripheral portion 11 is applied. Therefore, it becomes possible to sufficiently resist the force via the end flange portion 8a. With this, it is possible to further suppress the flexural deformation of the outer peripheral portion 11 and to sufficiently prevent the positional displacement of the die molding portion 7 as a whole, etc.

In the supporting portion 15, the first portion 15a is greater than the second portion 15b in thickness (see FIG. 2). With this, it is possible to increase the supporting force when abutted against the tip end 8b of the end flange portion 8a, thereby stably and securely suppressing the flexural deformation of the outer peripheral portion 11 by the pressing-down force.

Furthermore, the first portion 15a is adapted to be substantially horizontal. With this, the first portion 15a is brought into a vertical abutment against the tip end 8b of the end flange portion 8a by applying the pressing-down force. Therefore, it is possible to obtain a stable supporting force to support the outer peripheral portion 11.

Furthermore, the second portion 15b is less than the first portion 15a in thickness. With this, it becomes possible to suppress the occurrence of sink of the outer peripheral portion 11 when conducting the die molding by a rubber material or a resin material.

The second portion 15b extending from the midpoint 15c toward the bent portion lie of the outer peripheral portion 11 is inclined relative to the first portion 15a and is perpendicular to the bent portion 11e, thereby effectively suppressing sink on the bent portion 11e where sink tends to occur during the die molding.

Second Embodiment

Figure 4:
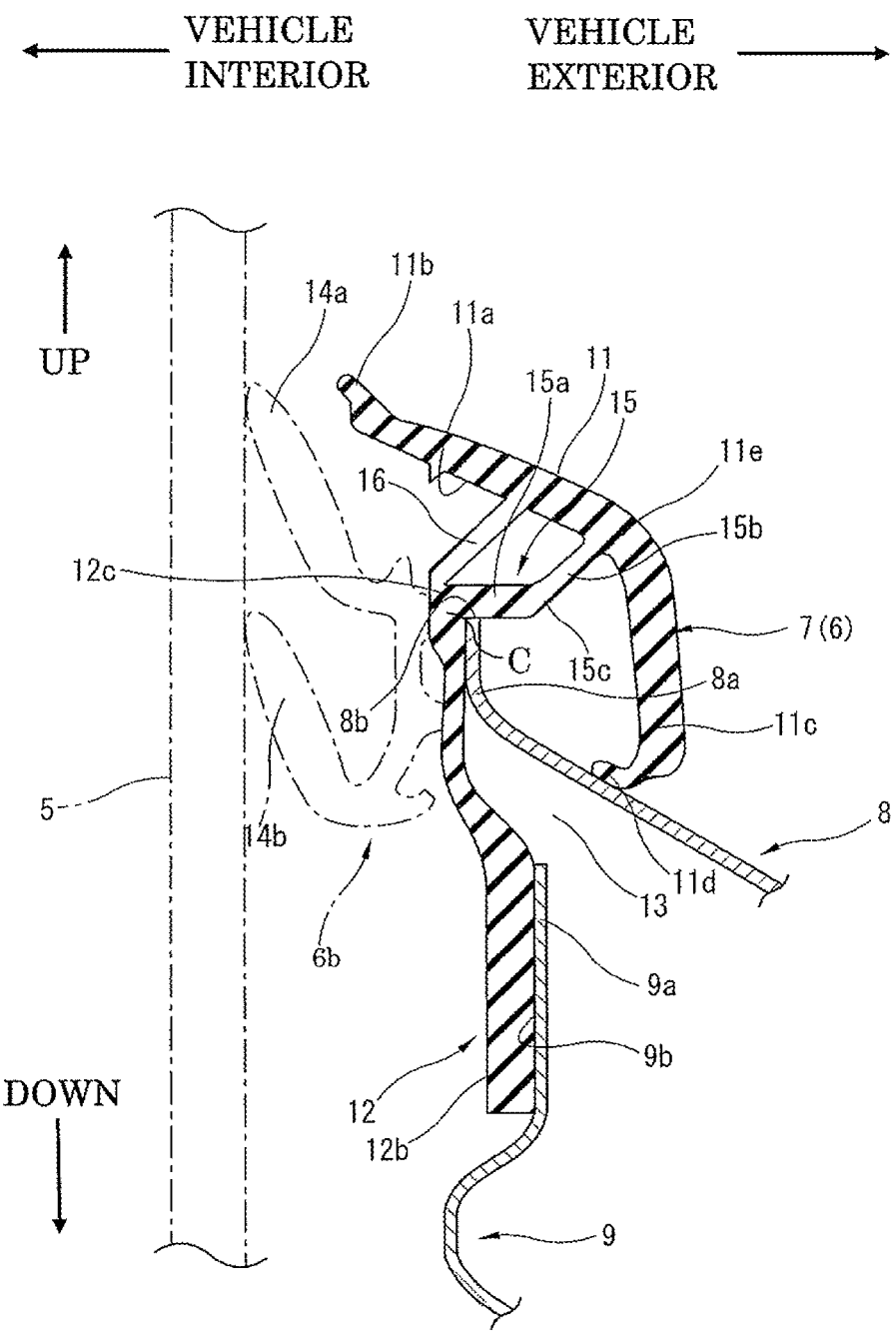
FIGS. 4-6 are views similar to FIG. 2, but respectively showing glass runs according to second to fourth embodiments of the present invention.

FIG. 4 shows a glass run according to the second embodiment of the present invention, which is the same as that according to the first embodiment, except in that a reinforcing rib 16 that connects a tip end of the end portion 12c of the holding portion 12 with the inner surface 11a of the upper end portion 11b of the outer peripheral portion 11 is monolithically joined thereto. This reinforcing rib 16 is formed at a position that is closer to the vehicle interior than the supporting portion 15, to be generally parallel with the supporting portion 15 along the longitudinal direction of the outer peripheral portion 11.

Therefore, according the second embodiment, the reinforcing rib 16 can assist the supporting portion 15. Therefore, it becomes possible to further resist the force to press down the outer peripheral portion 11. As a result of this, it is possible to more effectively suppress the flexural deformation of the outer peripheral portion 11.

Since the outer peripheral portion 11 and the holding portion 12 are doubly connected with each other by the supporting portion 15 and the reinforcing rib 16, it is possible to prevent the increase of the size of the opening 13 caused by deformation of the lower end portion 11c of the outer peripheral portion 11 in the direction of the vehicle exterior. That is, it becomes possible to prevent the opening 13 from accidentally opening up. With this, it is possible to keep the lip portion 11d of the outer peripheral portion 11 in abutment firmly all the time against the upper surface of the end flange portion 8a.

Third Embodiment

Figure 5:
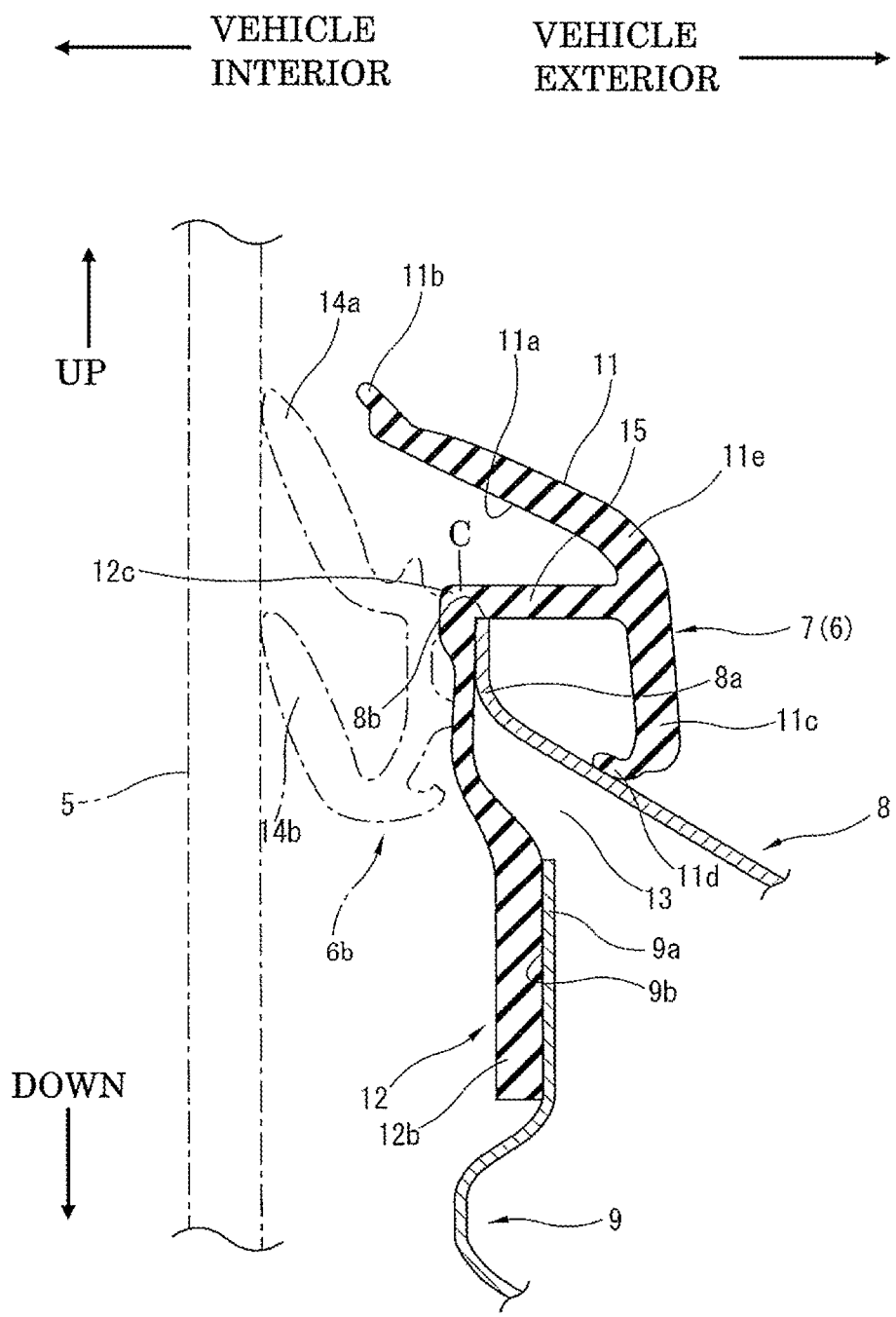

FIG. 5 shows a glass run according to the third embodiment of the present invention, in which structure of the supporting portion 15 of the first embodiment has been modified.

That is, the supporting portion 15 is provided between the end portion 12c of the holding portion 12 and the inner surface 11a of a spot below the bent portion 11e of the outer peripheral portion 11 and is adapted to be substantially horizontally arranged such that the supporting portion 15 is brought into a vertical abutment against the tip end 8b of the end flange portion 8a, when the glass run 6 is attached to the window frame 4 by pressing down the outer surface of the outer peripheral portion 11. Furthermore, the supporting portion 15 as a whole has a substantially uniform thickness that is relatively thick to be as thick as that of the first portion 15a.

According to the third embodiment, the supporting portion 15 as a whole is thick and thereby increased in rigidity. This increases the supporting force for supporting the outer peripheral portion 11 when abutted against the tip end 8b of the end flange portion 8a, thereby further suppressing the flexural deformation of the outer peripheral portion 11 and effectively preventing the opening 13 from opening similar to the second embodiment.

Fourth Embodiment

Figure 6:
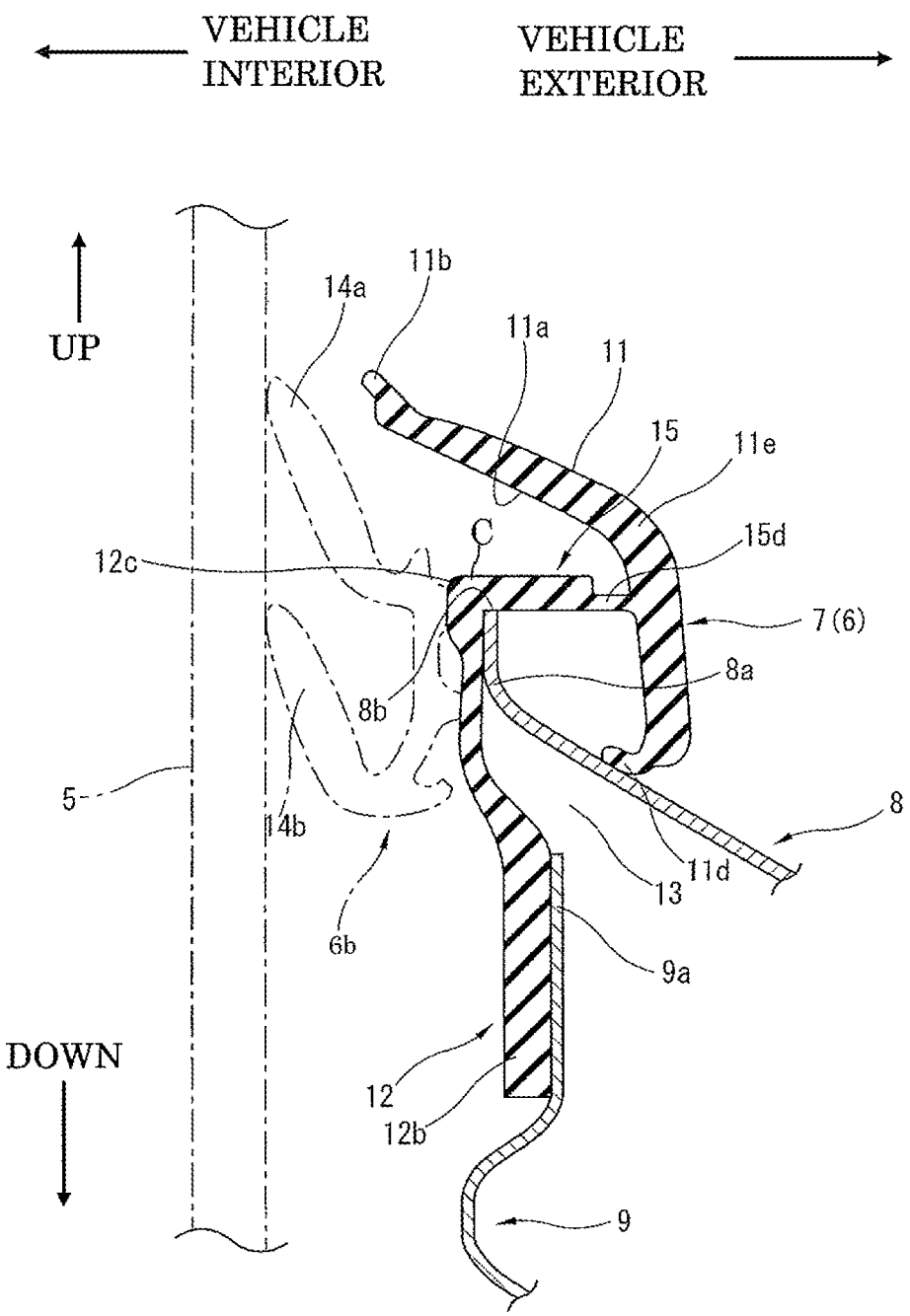

FIG. 6 shows a glass run according to the fourth embodiment of the present invention, which is similar to that according to the third embodiment, except in that an end portion 15d of the supporting portion 15 on the side of the outer peripheral portion 11 is formed thinner in thickness as compared with the rest of the supporting portion 15.

Similar to the first embodiment, according to the fourth embodiment, it is possible to suppress the flexural deformation of the outer peripheral portion 11 and to prevent the opening 13 from opening, when pressing down the outer peripheral portion 11.

The present invention is not limited to the above-mentioned exemplary embodiments. For example, the die molding portion 7 is not limited to one positioned between the lower side section 6b as a waist side (waist line) seal and the vertical section 6c, but also may be applied to other positions of the window frame 4 (see FIG. 7). Furthermore, it is possible to further change structure of the supporting portion 15.

The entire disclosure of Japanese Patent Application No. 2021-107186 filed on Jun. 29, 2021, of which priority is claimed in the present application, including specification, drawings, claims and summary, is incorporated herein by reference in its entirety.

What is claimed is:

1. A glass run adapted to be attached to an inner peripheral section of a window frame formed by an inner panel and an outer panel of a door, the glass run comprising:
   a first straight portion formed by an extrusion molding; and
   a die molding portion forming a corner portion of the glass run, the corner portion being connected to an end portion of the first straight portion, the die molding portion being formed by a die molding, the die molding portion comprising:
      an outer peripheral portion that is adapted to cover an end flange portion of the outer panel of the door;
      a holding portion that has one end portion connected to a first position of an inner surface of the outer peripheral portion, and another end portion adapted to extend toward the inner panel of the door; and
      a supporting portion provided between the holding portion and a second position of the inner surface of the outer peripheral portion, the second position being defined as a position to which the one end portion of the holding portion is not directly connected,
   wherein the die molding portion has an inner space and an opening of the inner space that are defined between the outer peripheral portion and the holding portion such that, when the glass run is attached to the window frame, the end flange portion of the outer panel of the door is inserted into the inner space from the opening, and then the supporting portion is brought into abutment against a tip end of the end flange portion of the outer panel of the door,
   wherein the supporting portion is provided in the inner space of the die molding portion and is continuously formed to cover a range in which a force to press down an outer surface of the outer peripheral portion of the die molding portion is applied, when the glass run is attached to the window frame, and
   wherein a corner is formed between the holding portion and the supporting portion such that the tip end of the end flange portion of the outer panel is fit to the corner.

2. The glass run as claimed in claim 1, wherein the supporting portion is formed into a plate shape extending between an end portion of the holding portion and the second position of the inner surface of the outer peripheral portion,
   wherein the supporting portion has a first portion that extends in a direction of the outer peripheral portion from the end portion of the holding portion to a midpoint between the holding portion and the outer peripheral portion, and a second portion that extends from the midpoint to the second position of the inner surface of the outer peripheral portion, and
   wherein the first portion is greater than the second portion in thickness.

3. The glass run as claimed in claim 2, wherein the first portion of the supporting portion is adapted to be substantially horizontal such that the first portion is brought into a vertical abutment against the tip end of the end flange portion of the outer panel, when the glass run is attached to the window frame by pressing down the outer surface of the outer peripheral portion,
   wherein, when the first portion of the supporting portion is substantially horizontal, the second portion of the supporting portion is inclined relative to the first portion and extends from the midpoint toward a bent portion of the outer peripheral portion, a position of the bent portion corresponding to the second position of the inner surface of the outer peripheral portion.

4. The glass run as claimed in claim 3, wherein the second portion of the supporting portion is substantially perpendicular to the bent portion of the outer peripheral portion.

5. The glass run as claimed in claim 3, wherein the outer peripheral portion in a vertical cross-section of the glass run has an inclined upper half portion that extends from the bent portion to an upper end portion of the outer peripheral portion, and a lower half portion that extends substantially vertically from the bent portion to a lip portion formed at a lower end portion of the outer peripheral portion.

6. The glass run as claimed in claim 2, wherein a rib that connects the end portion of the holding portion with the inner surface of the outer peripheral portion is provided between the holding portion and the outer peripheral portion at a position that is closer to a vehicle interior than the supporting portion.

7. The glass run as claimed in claim 6, wherein the rib is substantially parallel with the second portion of the supporting portion.

8. The glass run as claimed in claim 2, wherein the holding portion has an upper end portion that is connected to the first position of the inner surface of the outer peripheral portion, and the upper end portion of the holding portion is substantially perpendicular to the first portion of the supporting portion.

9. The glass run as claimed in claim 1, wherein the supporting portion is provided between an end portion of the holding portion and the inner surface of the outer peripheral portion and is adapted to be substantially horizontally arranged such that the supporting portion is brought into a vertical abutment against the tip end of the end flange portion of the outer panel, when the glass run is attached to the window frame by pressing down the outer surface of the outer peripheral portion, the supporting portion as a whole having a substantially uniform thickness.

10. The glass run as claimed in claim 1, wherein the supporting portion is provided between an end portion of the holding portion and the inner surface of the outer peripheral portion and is adapted to be substantially horizontally arranged such that the supporting portion is brought into a vertical abutment against the tip end of the end flange portion of the outer panel, when the glass run is attached to the window frame by pressing down the outer surface of the outer peripheral portion, the supporting portion having a first portion that is connected to the end portion of the holding portion and a second portion that is connected to the inner surface of the outer peripheral portion, the second portion being less than the first portion in thickness.

11. The glass run as claimed in claim 1, wherein the corner is adapted to extend along the tip end of the end flange portion of the outer panel such that top and inner surfaces of the tip end of the end flange portion of the outer panel are respectively brought into abutment and surface contact against a lower surface of the supporting portion and an outer surface of the holding portion.

12. The glass run as claimed in claim 1, wherein the supporting portion is substantially perpendicular to the holding portion and vice versa at the corner.

13. The glass run as claimed in claim 1, wherein the holding portion and the supporting portion are adapted to be respectively substantially vertically and horizontally arranged at the corner, and the end flange portion of the outer panel is substantially vertically arranged, such that the tip end of the end flange portion of the outer panel is fit to the corner.

14. The glass run as claimed in claim 1, wherein the outer peripheral portion is formed at a lower end thereof with a lip portion that is adapted to be brought into an elastic abutment against an outer surface of the outer panel.

15. The glass run as claimed in claim 1, wherein the holding portion has an upper end portion that is connected to the first position of the inner surface of the outer peripheral portion, and the upper end portion of the holding portion is substantially perpendicular to the supporting portion.

16. The glass run as claimed in claim 1, wherein the supporting portion is continuously formed in a longitudinal direction of the die molding portion.

17. The glass run as claimed in claim 16, wherein the first straight portion is formed on an inner side thereof with upper and lower lips that are adapted to be slidably in contact with an outer surface of a door glass of the door, thereby providing sealing between the window frame and the door glass.

18. The glass run as claimed in claim 1, wherein the glass run further comprises a second straight portion, and the die molding portion is positioned between the first straight portion as a lower side section of the glass run and the second straight portion as a vertical side section of the glass run, the die molding portion connecting the first straight portion and the second straight portion together.

\* \* \* \* \*